United States Patent
Clay-Smith

(10) Patent No.: US 6,783,062 B1
(45) Date of Patent: Aug. 31, 2004

(54) SYSTEM FOR INHIBITING FRAUD IN RELATION TO THE USE OF NEGOTIABLE INSTRUMENTS

(75) Inventor: Craig Mark Clay-Smith, Musgrave (ZA)

(73) Assignee: Craig M. Clay-Smith, Musgrave (ZA)

( * ) Notice: Subject to any disclaimer, the term of this patent is extended or adjusted under 35 U.S.C. 154(b) by 31 days.

(21) Appl. No.: 10/048,893

(22) PCT Filed: Aug. 1, 2000

(86) PCT No.: PCT/IB00/01074

§ 371 (c)(1), (2), (4) Date: Feb. 1, 2002

(87) PCT Pub. No.: WO01/09854

PCT Pub. Date: Feb. 8, 2001

(30) Foreign Application Priority Data

Aug. 3, 1999 (ZA) .............................................. 994971
Aug. 23, 1999 (ZA) .............................................. 995348

(51) Int. Cl.[7] .............................................. G06F 17/60
(52) U.S. Cl. ...................... 235/379; 235/380; 235/382; 235/375; 705/39; 705/44; 705/45
(58) Field of Search ............................... 235/379, 380, 235/382, 375, 381; 705/39, 44, 45, 42, 16, 17, 18; 902/22, 24, 25

(56) References Cited

U.S. PATENT DOCUMENTS

| | | | | | |
|---|---|---|---|---|---|
| 3,624,357 A | * | 11/1971 | Wright | .......................... | 235/381 |
| 4,317,957 A | * | 3/1982 | Sendrow | ....................... | 705/71 |
| 5,208,858 A | | 5/1993 | Vollert et al. | | |
| 5,465,206 A | * | 11/1995 | Hilt et al. | ...................... | 705/40 |
| 5,484,988 A | * | 1/1996 | Hills et al. | .................... | 235/379 |
| 5,546,523 A | * | 8/1996 | Gatto | ........................... | 345/811 |
| 5,570,465 A | * | 10/1996 | Tsakanikas | ................ | 358/1.15 |
| 5,671,282 A | | 9/1997 | Wolff et al. | | |
| 5,677,955 A | * | 10/1997 | Doggett et al. | ............... | 705/76 |
| 5,678,937 A | * | 10/1997 | Smith | .......................... | 400/78 |
| 6,144,940 A | * | 11/2000 | Nishi et al. | .................. | 704/270 |
| 6,170,744 B1 | * | 1/2001 | Lee et al. | .................... | 235/380 |
| 6,195,452 B1 | * | 2/2001 | Royer | ......................... | 382/135 |
| 6,282,523 B1 | * | 8/2001 | Tedesco et al. | ............... | 705/45 |
| 6,311,170 B1 | * | 10/2001 | Embrey | ....................... | 705/40 |

FOREIGN PATENT DOCUMENTS

| | | |
|---|---|---|
| EP | 0161181 | 11/1985 |
| EP | 0782114 | 2/1997 |
| FR | 2534712 | 4/1984 |
| WO | WO 9726618 | 7/1997 |
| WO | WO 9957688 | 11/1999 |

* cited by examiner

Primary Examiner—Michael G. Lee
Assistant Examiner—Uyen-Chau N. Le
(74) Attorney, Agent, or Firm—Brinks Hofer Gilson & Lione

(57) ABSTRACT

The invention relates to a system for inhibiting fraud in relation to the use of negotiable instruments and, particularly, in relation to cheques and credit cards. The system requires the owners of cheques and credit cards to be registered with the system, as well as the presentees to whom cheques and credit cards are presented. Via an authorisation and verification procedure to be followed respectively by owners and presentees, particularly by communicating with a central communication and processing unit, fraud in relation to the presentation of cheques and credit cards can be largely eliminated. Communication with the central communication and processing unit will be via telephone lines, although adaptation to accommodate internet communication also is envisaged.

15 Claims, 3 Drawing Sheets

SYSTEM FOR INHIBITING FRAUD IN RELATION TO THE USE OF NEGOTIABLE INSTRUMENTS

BACKGROUND OF THE INVENTION

1. Field of the Invention

THIS INVENTION relates to a system for inhibiting fraud in relation to the use of negotiable instruments.

2. Description of the Related Art

Within this specification by a negotiable instrument is meant a cheque, a credit card, a debit card, a bond, a share certificate, an account card, a traveller's cheque, an electronic transfer, and any other instrument that has inherent value to the owner thereof and in relation to which the owner can suffer a financial loss as a result of unauthorized and/or fraudulent dealing therewith by third parties.

Fraud in relation to the use of negotiable instruments is an international problem. Many different forms of fraud that can result in the owner of a negotiable instrument suffering a financial loss are known, with the common element generally being that the negotiable instrument is presented for serving as a payment for goods purchased, for converting its value into cash, or for depositing its value into a third party account, without authorization of the original owner or in a form in which it has been fraudulently tampered wit to the detriment of the original owner.

Although the invention as defined and described hereafter is directed mainly at inhibiting fraud in relation to the use of cheques and credit cards, it must be understood that the invention applies also to inhibiting of fraud in relation to the use of any other negotiable instrument and the features of the invention must be interpreted as such.

For the sake of convenience and clarity, the original owner of a negotiable instrument as herein envisaged shall merely be referred to as the owner of the negotiable instrument who, in relation to certain negotiable instruments such as cheques, promissory notes, and the like, will be the person issuing such instruments, and in relation to other negotiable instruments such as credit cards, will be the person who legally presents such instruments in order to serve their intended purpose. The owner is thus generally the person, whether a natural or a juristic person, who can suffer a loss as a result of the unauthorized or fraudulent use of the negotiable instrument of which he is the owner.

The person or body to whom a negotiable instrument is presented shall hereinafter be referred to as the presentee who, for example, in relation to cheques, and the like, generally will be a bank and particularly an employee of a bank, and in relation to credit cards, generally will be a vendor who accepts the use of a credit card as payment for goods purchased or for services rendered. The presentee also is the party who, in accordance with the present invention, is generally responsible for ensuring that the owner of the negotiable instrument is not prejudiced.

The person presenting a negotiable instrument to the presentee shall hereinafter merely be referred to as the presentor and, in practice, this may be a legitimate person to whom the instrument has been issued or who owns the instrument, or an illegitimate person who may be attempting a fraudulent act and/or who is not authorized to present the instrument.

It will be appreciated that the various negotiable instruments as herein envisaged can be associated with various different 'types' of presenters and presentees. Presentees need not necessarily be banks or vendors, but may be any third party who generally deals with and/or who is responsible for dealing with, such instruments.

The application of the system for inhibiting fraud in relation to the use of negotiable instruments is associated with a suitably programmed central communication and processing unit that can be communicated with via a direct telephone line, via the internet, or the like. This unit shall herein be referred to as a central communication and processing unit and any reference to this unit must be interpreted as a reference to a suitably programmed unit that includes means for communicating with the unit, as well as data processing means and data storage means that permit processing of stored data and of data communicated to it, for enabling the system of the invention as defined hereafter.

BRIEF SUMMARY OF THE INVENTION

According to the invention there is provided a system for inhibiting fraud in relation to the use of negotiable instruments, which includes the steps of:

the owners of negotiable instruments communicating with a central communication and processing unit in order to register with the unit by providing information, including at least identification numbers, linked directly with the respective owners and information linked directly with the negotiable instruments in respect of which fraud is to be inhibited, each owner then being provided with an individual secret code by the unit; and the presentees of negotiable instruments communicating with the central communication and processing unit in order to register with the unit by providing information, including at least identification numbers, linked directly with the respective presentees, each presentee then being provided with an individual secret code by the unit, and which includes, in relation to each negotiable instrument to be issued or used by a registered owner, the steps of:

the registered owner communicating with the central communication and processing unit in order to authorize the negotiable instrument, by identification via the identification number and the individual secret code linked with the owner and by providing sufficient details in respect of the negotiable instrument for subsequently permitting the instrument to be verified, the unit then issuing an authorization code to be linked with the instrument; and upon presentation of the authorized negotiable instrument by a presentor to a presentee, the presentee communicating with the central communication and processing unit in order to verify the negotiable instrument, by identification via the individual secret code linked with the presentee and providing the authorization code linked with the instrument, the unit in response communicating to the presentee the details for verifying the instrument provided by the owner of the instrument and thereby permitting the presentee to verify the instrument as the instrument authorized by the owner.

The system of the invention particularly may provide for the central communication and processing unit to permit communication via a direct telephone line and, as such, includes an audiotext electronic processing system that permits verbal information to be converted into binary code, and a processing and memory system linked to the audiotext electronic processing system for processing information received by the audiotext electronic processing system and thereby carrying out the functions of the unit. Alternatively, or in addition, the central communication and processing unit may permit communication via the internet and, as such, may include a processing and memory system for receiving and processing information received via the internet and thereby carrying out the functions of the unit.

Presentees registering with the unit also will provide the unit with any other information, including at least their names, that will subsequently permit the unit to identify a particular presentee that dealt with the verification of a particular negotiable instrument.

Owners registering with the unit, insofar as the owners are natural persons, may provide at least their names and their official identity numbers. Insofar as owners are juristic persons such a registered businesses, upon registering with the unit they will provide at least their names and their official registration numbers.

The system of the invention may provide for owners registering with the unit, insofar as they wish to use the system for inhibiting fraud in respect of negotiable instruments such as cheques rendered payable via their bank accounts, to provide the unit with the name of each relevant bank, the branch code associated with the said relevant bank and the relevant bank account number.

Insofar as owners registering with the unit wish to use the system for inhibiting fraud in respect of negotiable instruments such as credit cards issued to them by banks and linked to accounts, the system will provide for such owners to provide the unit with the name of each relevant bank and the card type, the number of each relevant card and the name of the card owner that appears on the card.

Further according to the invention, the system may provide for the registered owner of a cheque being issued by the owner, when authorizing the cheque, to provide to the unit bank account details of the payee and an identification number linked with the payee, the cheque number, the amount indicated on the cheque and the name of the payee and, when issued by the unit with an authorization code, to apply the code to the cheque.

In relation to an authorized cheque, the system may provide for the presentee, upon being presented with an authorized cheque and in order to verify the cheque, following the identification of the presentee to the unit and the provision of the authorization code applied to the cheque, for the unit to communicate to the presentee account details of a payee, the identification number linked with a payee, a cheque number, an amount and a payee name and if this information matches the information applied to the cheque presented, to verify the cheque.

Still further, following verification of the cheque, the system may provide for the unit to provide the presentee with a transaction code which must be applied by the presentee to the cheque, the transaction code permitting details of verification as stored by the unit to be retrieved from the unit.

The system of the invention may provide still further for the registered owner of a credit card issued by a bank, upon authorizing a telephonic or an online credit card transaction, for the owner to provide the unit with the name of the bank that issued the card and the type of card, the card number and the name of the card owner that appears on the card, and when issued with an authorization code by the unit, to supply the code to the vendor with whom the transaction is taking place to permit the vendor as presentee to verify the credit card by communicating with the unit.

Still further according to the invention, the system may provide, when a registered owner of a credit card issued by a bank presents as presentor the card to a vendor as presentee, in order to perform a direct credit card transaction, for the authorization and verification of the card to be simultaneously performed by the presentee providing the unit with the credit card number and the presentor providing the unit with the individual secret code of the owner, in response to which the unit provides the presentee a name of a bank that issued a card, a card number and a name of a card owner and if this information matches the information on the card as presented to the presentee, the card is both authorized and verified thereby.

The invention extends also to a central communication and processing unit which is controlled by a software program for enabling a system for inhibiting fraud in relation to the use of negotiable instruments in accordance with the invention.

Still further, the invention extends to a software program for controlling the operation of a central communication and processing unit for enabling a system for inhibiting fraud in relation to the use of negotiable instruments in accordance with the invention.

It must be appreciated that the system of the invention as above defined may be applied specifically also to the authorization and verification of negotiable instruments not particularly in the form of cheques or credit cards, by applying the same principles to those applied when authorizing and verifying cheques or credit cards, and the system of the invention as defined must be interpreted as such.

Further features of the invention are described hereafter with reference to the accompanying drawings in the form of flow diagrams which illustrate, by way of example, a system for inhibiting fraud in relation to the use of negotiable instruments in the form of cheques and credit cards, in accordance with the invention. In the drawings:

DETAILED DESCRIPTION OF THE INVENTION

Figure 1:
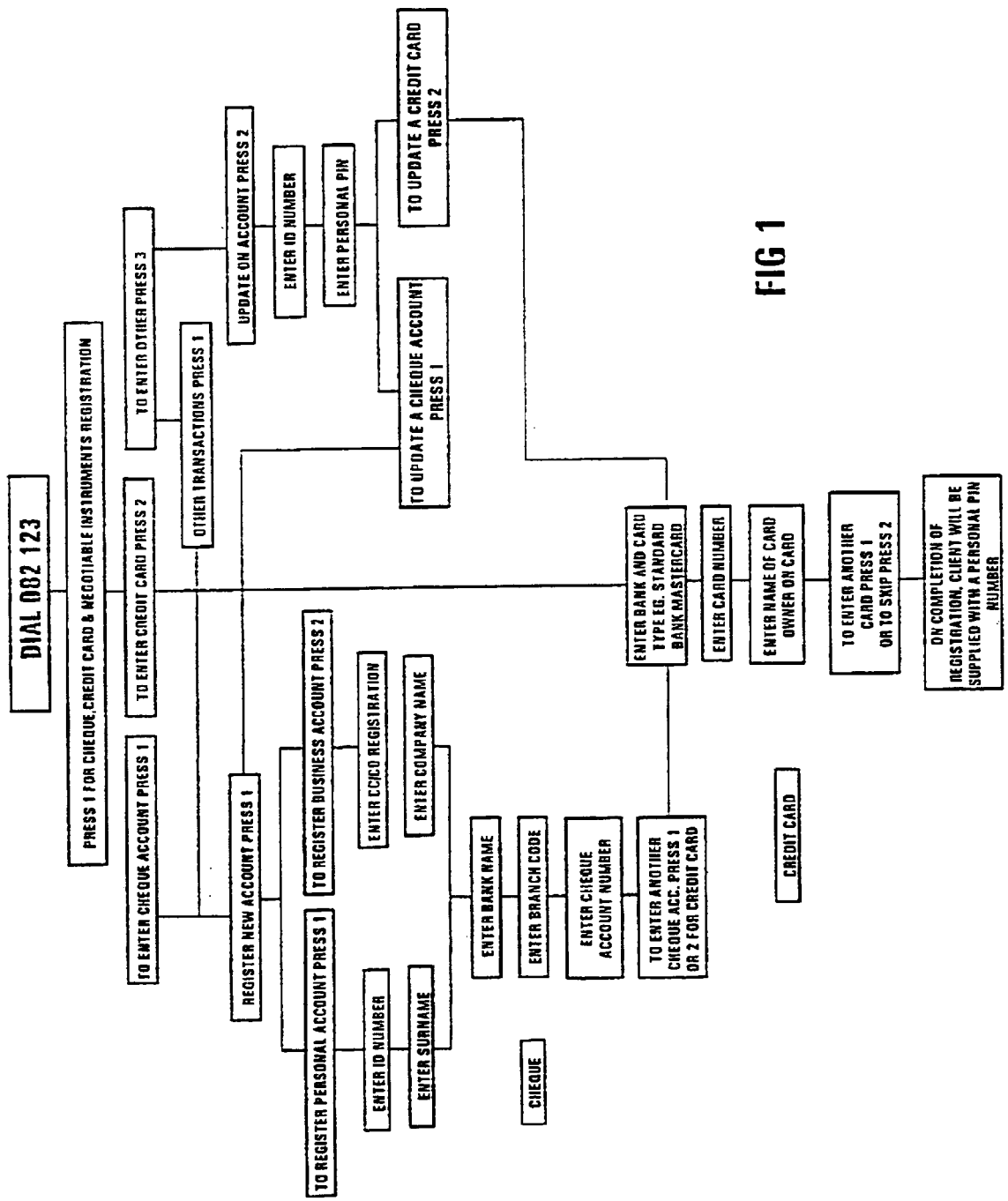
FIG. 1 illustrates in flow diagram form the system steps to be complied with by the owner of a negotiable instrument for registering with a suitably programmed central communication and processing unit, as part of a system for inhibiting fraud in relation to the use of negotiable instruments, in accordance with the invention.

Referring to the drawings, a system for inhibiting fraud in relation to the use of negotiable instruments, in accordance with the invention, is illustrated in flow diagram form, the system requiring initially that the owners of negotiable instruments, that wish to utilise the system, register with a central communication and processing unit. The unit permits communication therewith via a direct telephone line. In order to permit communication via a direct telephone line, the central communication and processing unit includes an audiotext electronic processing system, that permits verbal information to be converted into binary code, and a processing and memory system linked to the audiotext electronic processing system, for processing information received by the audiotext electronic processing system and Thereby carrying out the functions of the unit as described hereafter. Internet communication alternatively may be provided for and the processing and memory system of the unit will thus permit such communication in order to carry out the functions of the unit as described hereafter.

Referring particularly to FIG. 1 of the drawings, communication with the central communication and processing unit will commence by dialling a predetermined number and once communication is established, communicating with the system in response to prompting by the system and following a selected one of the flow lines illustrated. Particularly, if the system is to be utilised for inhibiting fraud in relation to the use of cheques associated with a cheque account, the owner of the cheque account will initially identify whether the account is a personal account or a business account and in the case of a personal account he will identify himself by his name and his ID number. If the account is a business account, the business account will be identified by the name of the business and its registration number. Thereafter the name of the bank associated with the cheque account will be entered, as well as the branch code of the bank and the relevant cheque account number and on finalisation thereof, the owner of the account will be provided with an individual secret code by the unit, hereinafter referred to as a personal pin number.

If the owner of a credit card wishes to utilise the system for inhibiting fraud in relation to the use of credit cards, the owner of the credit card will be prompted to enter details of the bank that issued the card and the type of card, the card number and the name of the card owner that appears on the card, following which a personal pin number will again be issued. It must be appreciated in the above regard that an owner can register both in respect to one or more cheque account and one or more credit card, for which he will be provided with the same pin number.

From the flow diagram it is clear that communication with the unit also can permit updating of, altering of, or addition to existing registrations, which will require an owner first to identify himself by his ID number and his personal pin number, whereafter the processes as above described can be repeated in relation to either a cheque account or a credit card. Insofar as the process steps associated with the registration of an owner with the unit, is apparent from the flow diagram, this is not described in further detail herein.

The system provides also for presentees of negotiable instruments o register with the system (the flow diagram for doing so not being illustrated). Presentees typically are bank tellers in relation to cheques and vendors in relation to credit cards and their registration essentially require at least their names and their identity numbers to be provided to the unit, in response to which the unit will provide them with personal pin numbers. Businesses or institutions with which presentees are associated also must be identified, typically via their names and via identification numbers.

The system of the invention provides next for a particular negotiable instrument to be authorized by the owner thereof, this authorization being necessary for subsequent verification of the negotiable instrument by a presentee to whom the instrument is presented.

Figure 2:
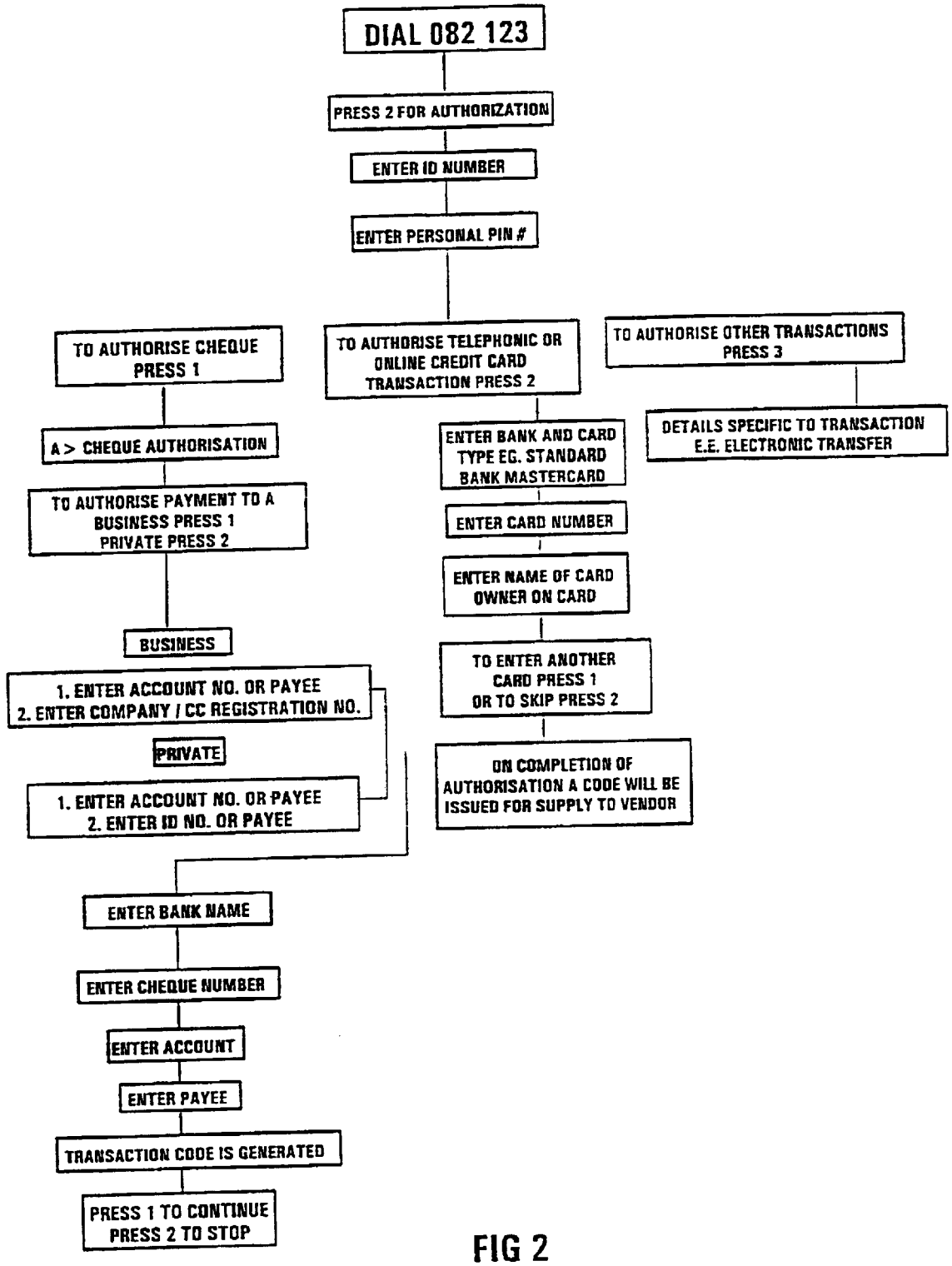
FIG. 2 illustrates in flow diagram form the system steps associated with the authorization of negotiable instruments, as part of the system for inhibiting fraud in relation to the use of negotiable instruments, in accordance with the invention.

From FIG. 2 of the drawings it is clear that in order to enable authorization, the same telephone number can be utilized for initiating communication with the central communication and processing unit, suitable prompting again allowing the owner of the negotiable instrument to enter the system in order to enable authorization of a negotiable instrument. Following entry of the owner's identity number and personal pin number, in order to authorize, for example, a cheque, the owner of the cheque will first identify whether the cheque is being made payable to a business or a private individual. If made payable to a business, the account number or the business, the name of the business and the registration number of the business, which must be applied to the cheque also, will be fed to the unit. In relation to a private individual, the name and the bank account number of the individual, as well as his ID number will be provided to the unit and also applied to the cheque. Following the above, details of the cheque, including the cheque number, the amount applied to the cheque and the name of the payee entered on the cheque will be provided to the unit, in response to which the unit will provide a transaction code which the owner of the cheque must apply to the cheque. The subsequent verification of the cheque will be described hereafter with reference to FIG. 3 of the drawings.

Where the owner of a credit card wishes to authorize a telephonic or online credit card transaction, the owner will provide to the central communication and processing unit details of the bank that issued the relevant card and the type of card, as well as the card number and the name of the owner appearing on the card. Thereafter the unit will issue an authorization code that can be supplied to the vendor with whom the transaction is to be carried out, permitting the vendor to communicate with the unit in order to verify the credit card with which the transaction is to be carried out.

The owner of any other negotiable instrument clearly can provide details of the negotiable instrument to the unit in a similar manner, so that following presentation of the negotiable instrument to a presentee, the presentee can verify details of the instrument in order to ensure that the instrument is in the form issued by the owner and in the form authorized by the owner.

Figure 3:
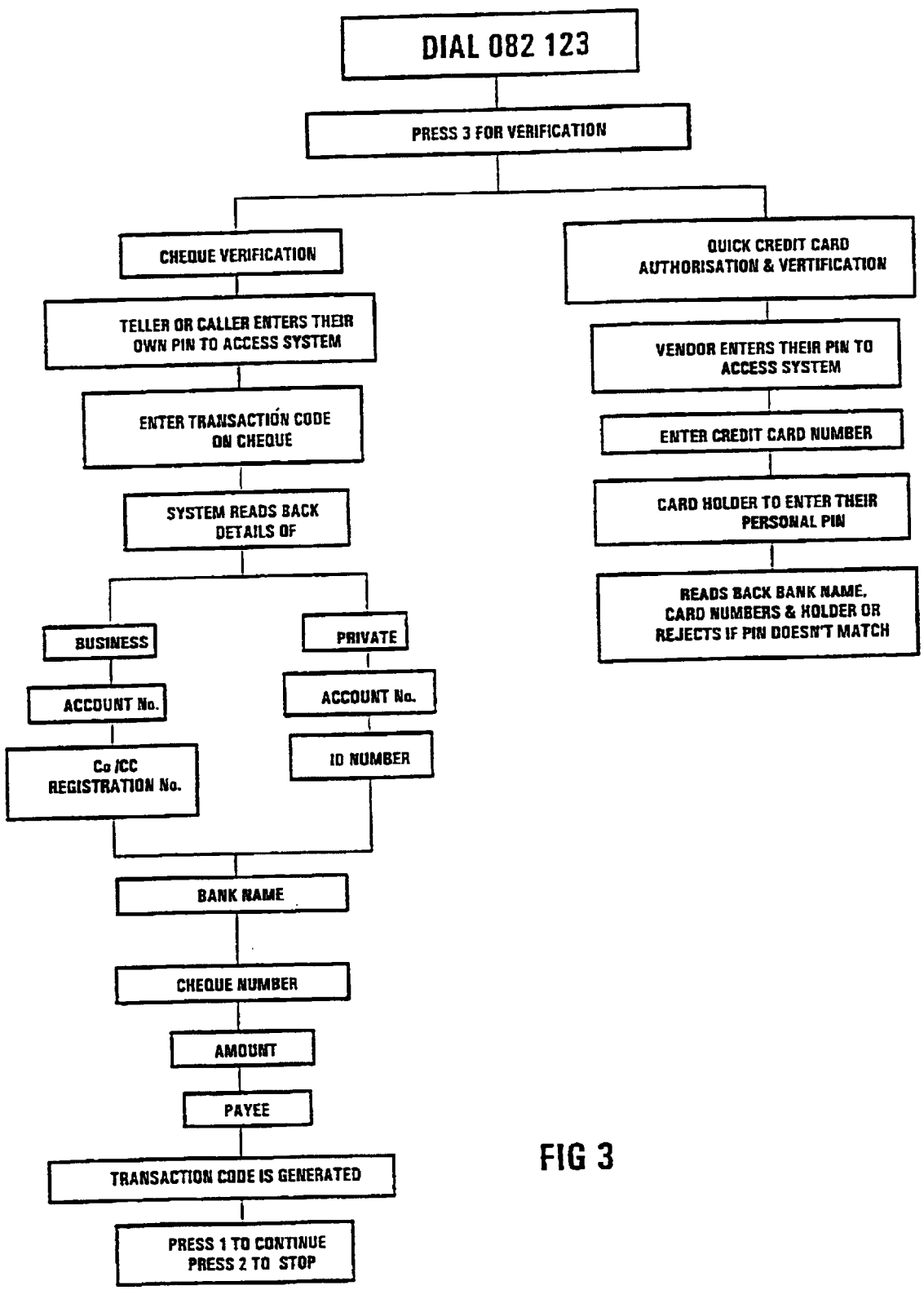
FIG. 3 illustrates in flow diagram form the system steps associated with the verification of negotiable instruments, as part of the system for inhibiting fraud in relation to the use of negotiable instruments, in accordance with the invention.

Referring to FIG. 3 of the drawings, in order for the presentee of a negotiable instrument to verify the instrument, the unit is again communicated with by dialling the same number and through suitable promoting, the verification process can then be followed.

In relation to a cheque where the presentee generally will be the teller of a bank, the teller will communicate with the unit by first providing details of the bank with which he is associated and a code and then his own personal identity number and his secret individual code, following which the transaction code as applied on the cheque will be entered into the unit. The unit will then read back to the teller all the details of a cheque that is associated with the particular transaction code and if these details are matched by the actual details applied to the cheque and as is in possession of the teller, the teller can verify that the cheque is in order. He can then proceed by paying the cheque into the account of the payee. The unit will generate a transaction code in response to verification and by applying this code to the cheque, it can subsequently be submitted to verify the actual verification and particularly to identify the presentee of the cheque who dealt with verification, if any subsequent questions arise.

Also as illustrated in the flow diagram of FIG. 3, a quick credit card authorization and verification can form a part of the system of the invention, this form of authorization and verification particularly being useful where a credit card is presented to a presentee, such as a vendor, in order to perform a direct credit card transaction. The vendor can then communicate with the central communication and processing unit by the same telephone number and following entry of his personal identification number, the vendor can then enter the credit card number of the credit card presented to him. The vendor can then hand the telephone to the card holder in order to permit entry of his personal identity number, following which the unit will read back to the vendor a name of a bank that issued a credit card, a card number and the name of a holder that appears on a card, and if these details match the details of the actual card presented, the card is effectively both authorized and verified thereby. The vendor can thus be certain that the card is the property of the presentor; owner and that the owner is authorized to use the card for a transaction.

It will be appreciated that the system of the invention as above described will greatly inhibit possible fraud in relation to the use of negotiable instruments and, particularly, in relation to cheques and credit cards. Particularly in relation to cheques, it will be ensured that a cheque issued by an owner can only be paid into a particular account of a payee, which is pre identified, and also that the amount of the cheque is as authorized in order to ensure that an increased amount will not be deposited into the account of the payee. The system also will ensure that a particular bank account is not linked to more than one owner, which will further inhibit possible fraud.

In relation to the use of a credit card, a vendor will be able to ensure that the card that is presented to him is that of the presentor of the card and, as such, that a transaction involving the card is permissible.

It will be appreciated that if either a cheque or a credit card is not verified by the unit, which in effect controls the operation of the system of the invention, in the case of a cheque, the cheque will not be deposited into the payee account, whereas in the case of a credit card, the vendor will not accept use of the credit card for carrying out a transaction. It is thus ensured that an unauthorized payee or a person not authorized to present a particular credit card for a transaction, cannot successfully carry out a transaction and, as such, the owner of the negotiable instrument cannot be prejudiced.

The interlinking of owner information by the system clearly ensures the effectiveness of the system insofar as different owners cannot be linked with the same information.

It will be appreciated that the principles of the invention can apply also in relation to various other negotiable instruments such as traveller's cheques, bonds, electronic transfers, promissory notes, bank transfers, sureties, share certificates, credit notes, debit cards, smart cards, petrol cards, account cards, membership cards at clubs, and the like.

It is envisaged that the system of the invention can be applied both nationally to a particular country and also internationally, by enabling suitable central communication and processing units which can be communicated with in the manner described. By banks insisting that all cheques issued by their bank account holders are authorized through the system, owners will be effectively protected, whereas banks also will become less exposed to potential fraud. Similarly, by insisting that vendors first verify credit cards before accepting the use thereof, thus ensuring that cards are preauthorized, credit card fraud also will be greatly inhibited.

In relation to other forms of negotiable instruments, presentors and presentees may vary in various different respects although the same principles of the invention can clearly apply to such instruments insofar as any attempt to convert such instruments to cash, to alter the value of such instruments, and the like, can be effectively inhibited with the use of the system.

The invention clearly extends also to a suitable communication and processing system that is suitably programmed to enable the system to be carried out, as well as to a suitable software program that can cooperate with a communication and processing system for enabling the system of the invention. The exact software and program associated with the communication and processing system clearly is greatly variable, while still permitting the enablement of the system as hereinabove defined and described.

What is claimed is:

1. A system for inhibiting fraud in relation to the use of negotiable instruments, which includes the steps of:

owners of negotiable instruments communicating with a central communication and processing unit in order to register with the central communication and processing unit and thereby becoming a registered owner by providing information, including at least identification numbers, linked directly with the owners and information linked directly with the negotiable instruments in respect of which fraud is to be inhibited, the owners then being provided with an individual secret code by the central communication and processing unit; and presentees of negotiable instruments communicating with the central communication and processing unit in order to register with the central communication and processing unit by providing information, including at least identification numbers, linked directly with presentees, each presentee then being provided with an individual secret code by the central communication and processing unit, and which includes, in relation to each negotiable instrument to be issued or used by the registered owner, the steps of:

the registered owner communicating with the central communication and processing unit in order to authorize the negotiable instrument, by identification via the identification number and the individual secret code linked with the registered owner and by providing sufficient details in respect of the negotiable instrument for subsequently permitting the instrument to be verified, the central communication and processing unit then issuing an authorization code to be linked with the instrument; and upon presentation of the authorized negotiable instrument by a presentor to the presentee, the presentee communicating with the central communication and processing unit in order to verify the negotiable instrument, by identification via the individual secret code linked with the presentee and providing the authorization code linked with the instrument, the central communication and processing unit in response communicating to the presentee the details for verifying the instrument provided by the registered owner of the instrument and thereby permitting the presentee to verify the instrument as the instrument authorized by the registered owner.

2. A system as claimed in claim 1, in which the central communication and processing unit permits communication via a direct telephone line and includes an audiotext electronic processing system that permits verbal information to be converted into binary code, and a processing and memory system linked to the audiotext electronic processing system for processing information received by the audiotext electronic processing system and thereby carrying out the functions of the central communication and processing unit.

3. A system as claimed in claim 1, in which the central communication and processing unit permits communication via the internet and includes a processing and memory system for receiving and processing information received via the internet and thereby carrying out the functions of the central communication and processing unit.

4. A system as claimed in claim 1, in which the presentees registering with the central communication and processing unit also will provide the central communication and processing unit with at least their names and, where applicable, with details of the business or institution with which they are associated.

5. A system as claimed in claim 1, in which owners registering with the unit, insofar as the owners are natural persons, will provide at least their names and their official identity numbers.

6. A system as claimed in claim 5, in which owners registering with the central communication and processing unit, insofar as they wish to use the system for inhibiting fraud in respect of negotiable instruments including cheques rendered payable via their bank accounts, will provide the central communication and processing unit with the name of each relevant bank, a branch code associated with the relevant bank and a relevant bank account number.

7. A system as claimed in claim 6, in which the registered owner of a cheque being issued by the registered owner, when authorizing the cheque, provides to the central communication and processing unit bank account details of a payee and an identification number linked with the payee, a cheque number, the amount indicated on the cheque and the name of the payee and, when issued by the central communication and processing unit with an authorization code, applies the code to the cheque.

8. A system as claimed in claim 7, in which the presentee, upon being presented with an authorized cheque and in order to verify the cheque, following the identification of the presentee to the central communication and processing unit and the provision of the authorization code applied to the cheque, has communicated to him by the central communication and processing unit the bank account details of a payee, the identification number linked with a payee, a cheque number, an amount and a payee name and if this information matches the information applied to the cheque presented, verifies the cheque.

9. A system as claimed in claim 8, in which the central communication and processing unit provides to the presentee, following verification of a cheque, a transaction code which must be applied by the presentee to the cheque and which permits details of verification as stored by the central communication and processing unit to be retrieved from the central communication and processing unit.

10. A system as claimed in claim 5, in which owners registering with the central communication and processing unit, insofar as they wish to use the system for inhibiting fraud in respect of negotiable instruments including credit cards issued to them by banks and linked to accounts, will provide the central communication and processing unit with the name of each relevant bank and the card type, the number of each relevant card and the name of the card owner that appears on the card.

11. A system as claimed in claim 10, in which the registered owner of a credit card issued by a bank, upon authorising a telephonic or an on-line credit card transaction, provides to the central communication and processing unit the name of the bank that issued the card and the type of card, the card number and the name of the card owner that appears on the card and when issued with an authorization code by the central communication and processing unit, supplies the code to a vendor with whom the transaction is taking place to permit the vendor as presentee to verify the credit card by communicating with the central communication and processing unit.

12. A system as claimed in claim 10, in which, when a registered owner of a credit card issued by a bank presents as presentor the card to a vendor as presentee, in order to perform a direct credit card transaction, the authorization and verification of the card is simultaneously performed by the presentee providing the central communication and processing unit with the credit card number and the presentor providing the central communication and processing unit with the individual secret code of the registered owner, in response to which the central communication and processing unit provides the presentee a name of a bank that issued a card, a card number and a name of a card owner and if this information matches the information on the card as presented to the presentee, the card is both authorized and verified thereby.

13. A system as claimed in claim 1, in which owners registering with the central communication and processing unit, insofar as the owners are juristic persons such as registered businesses, will provide at least their names and their official registration numbers.

14. A central communication and processing unit which is controlled by a software program for enabling a system for inhibiting fraud in relation to the use of negotiable instruments as claimed in claim 1.

15. A software program for controlling the operation of a central communication and processing unit for enabling a system for inhibiting fraud in relation to the use of negotiable instruments as claimed in claim 1.

* * * * *